US012459092B2

(12) United States Patent
Yang

(10) Patent No.: US 12,459,092 B2
(45) Date of Patent: Nov. 4, 2025

(54) PNEUMATIC NAIL GUN

(71) Applicant: ZHEJIANG PRULDE ELECTRIC APPLIANCE CO., LTD., Zhejiang (CN)

(72) Inventor: Weiming Yang, Jinhua (CN)

(73) Assignee: ZHEJIANG PRULDE ELECTRIC APPLIANCE CO., LTD., Jinhua (CN)

( * ) Notice: Subject to any disclaimer, the term of this patent is extended or adjusted under 35 U.S.C. 154(b) by 0 days.

(21) Appl. No.: 18/432,537

(22) Filed: Feb. 5, 2024

(65) Prior Publication Data

US 2024/0269812 A1 Aug. 15, 2024

(30) Foreign Application Priority Data

Feb. 9, 2023 (CN) ........................ 202310110657.2

(51) Int. Cl.
*B25C 1/04* (2006.01)

(52) U.S. Cl.
CPC .................................... *B25C 1/047* (2013.01)

(58) Field of Classification Search
CPC .. B25C 1/047; B25C 1/06; B25C 1/04; B25C 1/042; B25C 1/008; B25C 1/041
See application file for complete search history.

(56) References Cited

U.S. PATENT DOCUMENTS

| | | | | |
|---|---|---|---|---|
| 11,478,912 | B2 | 10/2022 | Yang et al. | |
| 2012/0286014 | A1* | 11/2012 | Pedicini | B25C 1/04 227/4 |
| 2015/0053736 | A1 | 2/2015 | Pomeroy et al. | |

FOREIGN PATENT DOCUMENTS

| | | | |
|---|---|---|---|
| CN | 109623736 | A | 4/2019 |
| DE | 112013001962 | T5 | 12/2014 |

OTHER PUBLICATIONS

Jul. 8, 2024 Extended Search Report issued in European Patent Application No. 24154904.7.

* cited by examiner

*Primary Examiner* — Veronica Martin
(74) *Attorney, Agent, or Firm* — Oliff PLC

(57) ABSTRACT

A pneumatic nail gun, relating to the field of power tools, including a body and nail feeding device, the body including cylinder and drive assemblies, the cylinder assembly including a first and second cylinder, striker, and interlocking structure, the first cylinder including a cylinder housing, first piston, and first chamber, the first piston having front and rear limit positions, the second cylinder including a barrel, second piston, and second chamber, the striker having initial and nail-striking positions which are synchronous to initial nail-striking positions of the second piston, an intake gap forms between the cylinder housing and first position at the front limit position so that external air flows into the first cylinder first chamber via the intake gap. Air intake into the first chamber is realized without forming holes on the sidewall of the cylinder housing, with improved intake efficiency of the first chamber and nail-driving performance.

14 Claims, 11 Drawing Sheets

PNEUMATIC NAIL GUN

FIELD

The subject matter described herein relates to power tools, and more particularly relates to a pneumatic nail gun.

BACKGROUND

A nail gun is a handheld nail-driving tool that uses a fast-moving striker to drive nails into wood or other materials. Based on the source of driving force, nail guns are divided into electric nail guns, pneumatic nail guns, and manual nail guns, etc. Existing nail guns generally have a dual-cylinder structure, in which after a large piston in the larger cylinder moves, air in the larger cylinder is compressed to a predetermined extent to release a small piston in the smaller cylinder, causing the compressed air in the larger cylinder to be vented into the smaller cylinder via air flow passages to propel the small piston in the smaller cylinder to move fast, and then the fast-moving small piston brings the striker to move synchronously, whereby the fast-moving striker drives the nail into an object such as wood, implementing nail penetration.

To inlet air into the larger cylinder, an existing structure generally has intake holes formed on a side wall of a cylinder housing of the larger cylinder, so that when the large piston is located at a vented position, external air may flow into the larger cylinder via the intake holes. The small intake holes on the side wall of the cylinder housing render a low air intake efficiency of the larger cylinder, a consequence of which is that in a case of a fast nail-driving speed, due to the small intake throughput in each stroke of the larger cylinder, there would be no enough compressible air in the larger cylinder, resulting in inadequate magnitude of nail-driving force or shallow depth of nail penetration, failing to meet nail penetration criteria.

SUMMARY

To overcome the above and other drawbacks in existing technologies, the disclosure provides a pneumatic nail gun, in which an intake gap is formed between a cylinder housing and a first piston at a limit position so that external air may flow into the first cylinder via the intake gap, thereby significantly improving air intake efficiency of the first chamber and increasing nail-driving force and nail-penetration depth.

To achieve the technical objective noted supra, the disclosure provides a pneumatic nail gun, comprising a body and a nail feeding device, the body comprising a cylinder assembly and a drive assembly, the cylinder assembly comprising a first cylinder, a second cylinder, a striker, and an interlocking structure, the first cylinder comprising a cylinder housing, a first piston driven by the drive assembly, and a first chamber formed by fitting between the first cylinder and the cylinder housing, the first piston having a front limit position and a rear limit position relative to the cylinder housing, the second cylinder comprising a barrel, a second piston disposed in the barrel, and a second chamber formed by fitting between the second piston and the barrel, the striker being connected to the second piston, the striker and the second piston each having an initial position and a nail-striking position, the initial position and the nail-striking position of the striker being synchronous to the initial position and the nail-striking position of the second piston, the inter-locking structure limiting the second piston to the initial position while the first piston is moving from the front limit position towards the rear limit position, wherein an intake gap is formed between the cylinder housing and the first piston located at the front limit position, the intake gap allowing for external air to flow into the first chamber of the first cylinder.

In some implementations, an outer diameter of the first piston is smaller than an inner diameter of the cylinder housing, and the intake gap is formed between an outer peripheral wall of the first piston and an inner peripheral wall of the cylinder housing.

In some implementations, a first sealing ring interference-fitted with the inner peripheral wall of the cylinder housing is located at and sleeves an outer periphery of the first piston, and a front end of the cylinder housing is provided with an avoidance structure allowing for the first sealing ring to be at least partially detached from the inner peripheral wall of the cylinder housing.

In some implementations, the avoidance structure comprises a circular conical surface provided at a front end of the inner peripheral wall of the cylinder housing, the circular cylindrical surface having a larger front end and a smaller rear end, an inner diameter of the circular conical surface being greater than an outer diameter of the first sealing ring, so that the first sealing ring, which is located at the front limit position along with the first piston, is detached from the circular conical surface.

In some implementations, the avoidance structure comprises a recessed groove provided at a front end of the inner peripheral wall of the cylinder housing, a depth of the recessed groove being greater than an interference fit amount between the first sealing ring and the inner peripheral wall of the cylinder housing, so that a portion of the first sealing ring, which is located at the front limit position along with the first piston, corresponding to the recessed groove, is detached from a groove wall of the recessed groove.

In some implementations, the avoidance structure comprises an indentation provided at the front end of the cylinder housing, so that a portion of the first sealing ring, which is located at the front limit position along with the first piston, corresponding to the indentation, is detached from the cylinder housing due to being exposed to the indentation.

In some implementations, a first sealing ring interference-fitted with the inner peripheral wall of the cylinder housing is located at and sleeves an outer periphery of the first piston, and a portion of the first piston at the front limit position projects out of the cylinder housing, so that the first sealing ring, which is located at the front limit position along with the first piston, is detached from the cylinder housing.

In some implementations, an outer diameter of the first piston is smaller than an inner diameter of the cylinder housing, a first sealing ring interference-fitted with the inner peripheral wall of the cylinder housing is located at and sleeves an outer periphery of the first piston, the first piston at the front limit position completely projects out the cylinder housing, and the intake gap is formed between a rear end of the first piston and a front end of the cylinder housing.

In some implementations, a front end of the inner peripheral wall of the cylinder housing is provided with a circular conical surface for guiding the first piston to access the circular conical surface in the cylinder housing.

In some implementations, the second cylinder is disposed in the first cylinder, the barrel passes through the first piston, the interlocking structure is disposed in a rear end of the cylinder housing, the barrel is provided with a vent hole communicating the first chamber and the second chamber, and the vent hole is at least partially disposed rear to the second piston at the initial position so that compressed air in the first chamber flows into the second chamber via the vent hole to act on the second piston, driving the second piston to bring the striker to move forward from the initial position to the nail-striking position.

The technical solution noted supra offers the following benefits to the disclosure:

1. According to the pneumatic nail gun provided by the disclosure, when the first piston is located at a limit position, an intake gap is formed between the cylinder housing and the first piston, so that the external air may directly flow into the first chamber of the first cylinder via the intake gap, which may significantly improve air intake efficiency of the first chamber, ensuring that enough compressible air is filled in the first chamber; this may reasonably increase pneumatic force of the cylinder assembly against the second piston upon nail driving, and thus may reasonably increase a nail-driving speed of the striker to increase nail-driving force and nail-penetration depth in a continuous nail-driving process, thereby enhancing nail-driving performance.
2. When the first piston is located at the front limit position, the intake gap is formed between the outer peripheral wall of the first piston and the inner peripheral wall of the cylinder housing; in this case, formation of the intake gap does not require the first piston to be completely detached from the cylinder housing, which facilitates improving movement stability of the first piston.
3. By providing the avoidance structure at the front end of the cylinder housing, when the first piston is located at the front limit position, the first sealing ring is at least partially detached from the inner peripheral wall of the cylinder housing due to the avoidance structure, i.e., the first sealing ring at least partially does not contact the inner peripheral wall of the cylinder housing due to the avoidance structure, so that the intake gap formed between the outer peripheral wall of the first piston and the inner peripheral wall of the cylinder housing may facilitate smooth communication with the external air, resulting in smooth air intake into the first chamber. With this reasonable cylinder housing structure, the external air may smoothly flow into the first chamber via the intake gap.
4. In the first example structure, the avoidance structure is a circular conical surface provided at the front end of the inner peripheral wall of the cylinder housing; since the inner diameter of the circular conical surface is greater than the outer diameter of the first sealing ring, when the first piston and the first sealing ring are located at the front limit position, the first sealing ring does not contact the circular conical surface, allowing for smooth communication between the intake gap and the external air, which ensures that the external air may smoothly flow into the first chamber via the intake gap.
5. In the second example structure, the avoidance structure is a recessed groove provided at the front end of the inner peripheral wall of the cylinder housing; since the depth of the recessed groove is greater than an interference fit amount between the first sealing ring and the inner peripheral wall of the cylinder housing, when the first piston and the first sealing ring are located at the front limit position, a portion of the first sealing ring corresponding to the recessed groove does not contact the groove wall of the recessed groove, so that the intake gap may smoothly communicate with the external air via the recessed groove, which ensures that the external air may smoothly flow into the first chamber via the intake gap.
6. In the third example structure, the avoidance structure is an indentation provided at the front end of the cylinder housing; when the first piston and the first sealing ring are located at the front limit position, a portion of the first sealing ring corresponding to the indentation is exposed to the indentation, i.e., the portion of the first sealing ring corresponding to the indentation does not contact the inner peripheral wall of the cylinder housing, so that the intake gap may smoothly communicate with the external air via the indentation, which ensures that the external air may smoothly flow into the first chamber via the intake gap.
7. When the first piston and the first sealing ring are located at the front limit position, the first piston partially projects out of the cylinder housing, and the first sealing ring is detached from the cylinder housing along with the first piston, the first sealing ring does not contact the inner periphery wall of the cylinder housing, so that the intake gap may smoothly communicate with the external air, which ensures that the external air may smoothly flow into the first chamber via the intake gap.
8. When the first piston and the first sealing ring are located at the front limit position, the first piston completely projects out of the cylinder housing, so that the first sealing ring is detached from the cylinder housing along with the first piston; in this case, the intake gap is formed between the rear end of the first piston and the front end of the cylinder housing. By reasonably setting a specific positional relationship of the first piston at the front limit position relative to the cylinder housing, the intake gap can be smoothly formed between the first piston and the cylinder housing.
9. By providing the circular conical surface at the front end of the inner peripheral wall of the cylinder housing, while the first piston projecting out of the cylinder housing is moving from the front limit position to the rear limit position, the first piston may smoothly re-enter the cylinder housing under guide by the circular conical surface; the circular conical surface allows the first piston to re-enter the cylinder housing more smoothly, which improves movement stability of the first piston and thus improves nail-driving stability of the pneumatic nail gun.
10. When the second cylinder is disposed in the first cylinder, the compressed air in the first chamber may directly flow into the second chamber via the vent hole provided on the barrel of the second cylinder and act on the second piston, whereby the effective contact area may reasonably increase when the compressed air acts on the second piston, so that the second piston may receive a large initial action force, which increases the initial movement speed of the striker driven by the second piston released by the interlocking structure and thusly increases the nail-driving speed of the striker driven by the second piston, facilitating increasing nail-penetration depth and driving nails into a hard material, thereby facilitating enhancement of user experience. In addition, since the compressed air in the first chamber may directly flow into the second chamber via the vent hole, a need of providing, on the interlocking structure or other member, a passage structure for the compressed air to flow into the second chamber from the first chamber is eliminated, thereby lowering structural difficulty and air-tightness criteria of relevant members.

In the Accompanying Drawings: 100—body

Figure 1:
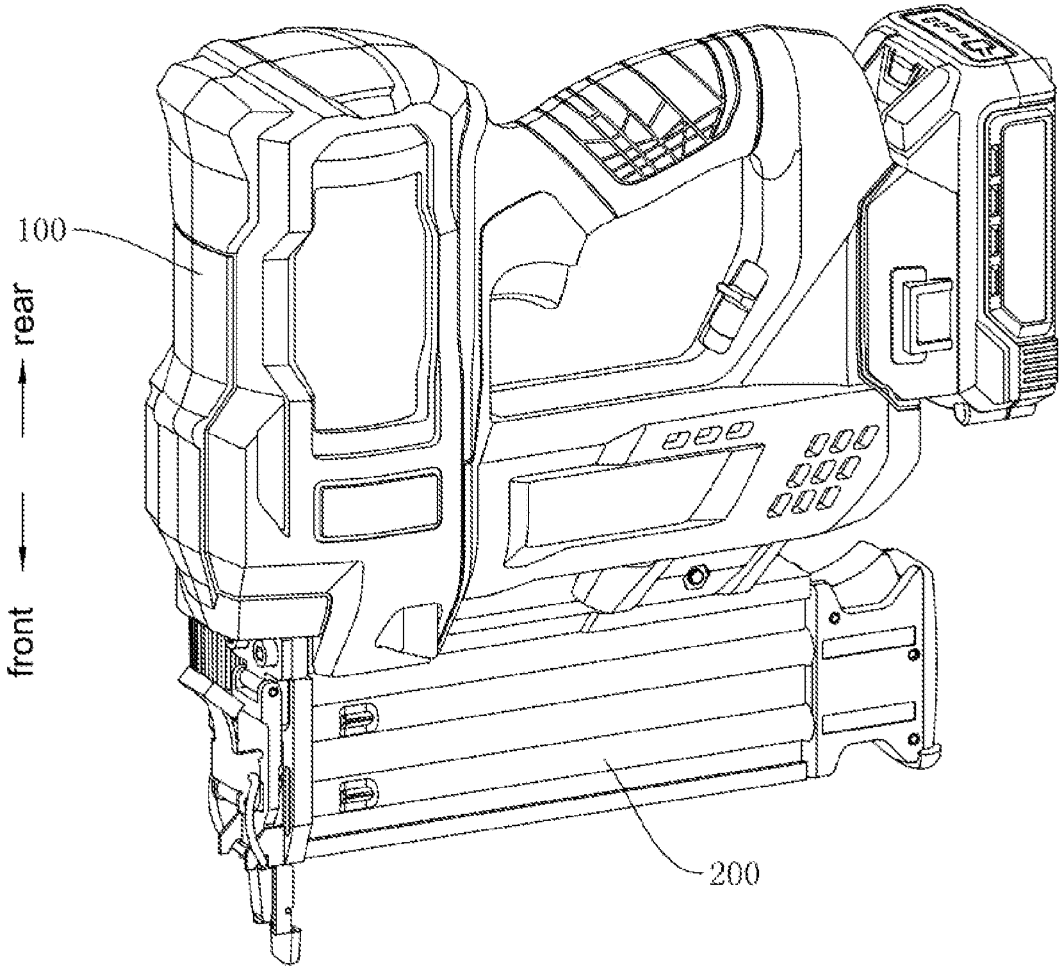
FIG. 1 is an overall structural diagram of a pneumatic nail gun according to a first implementation.

200—nail feeding device;

300—cylinder assembly; 310—first cylinder; 311—cylinder housing; 3111—circular conical surface; 3112—transitional surface; 3113—recessed groove; 3114—indentation; 312—first piston; 313—first chamber; 314—intake gap; 315—cylinder base; 316—first sealing ring; 317—third sealing ring; 318—pin rod; 319—support pillar; 320—second cylinder; 321—barrel; 3211—vent hole; 3212—narrowed opening portion; 3213—pore; 322—second piston; 323—second chamber; 324—second sealing ring; 325—head plug; 326—shock-absorbing cushion; 327—elastic valve sleeve; 330—striker; 340—interlocking structure; 341—fixed base; 342—locking bush; 3421—notch; 343—lock core; 3431—locking groove; 344—sliding block; 3441—stepped portion; 3442—through groove; 3443—second bevel; 345—nut; 346—spring; 347—elastic cushion; 348—lock housing; 3481—avoidance groove; 349—ejector pin; 3491—first bevel; 350—rod body;

400—drive assembly; 410—motor; 420—speed reducer; 421—output shaft; 430—crank handle; 440—connecting rod;

500—enclosure; 510—grip portion.

DETAILED DESCRIPTION OF EMBODIMENTS

Hereinafter, the disclosure will be further described through specific implementations with reference to the accompanying drawings. It is understood that the orientational or positional relationships indicated by the terms “upper,” “lower,” “left,” “right,” “longitudinal,” “transverse,” “inner,” “outer,” “vertical,” “horizontal,” “top,” and “bottom” refer to those orientational and positional relationships illustrated in the drawings, which are intended only for facilitating description of the disclosure and simplifying relevant depictions, but not for indicating or implying that the devices or elements compulsorily possess such specific orientations or are compulsorily configured and operated with the specific orientations; therefore, such terms should not be construed as limitations to the disclosure.

First Implementation

Referring to FIGS. 1 to 9, a pneumatic nail gun is provided according to a first implementation of the disclosure, comprising a body 100 and a nail feeding device 200, the body 100 being provided with a cylinder assembly 300 and a drive assembly 400, the cylinder assembly 300 comprising a first cylinder 310, a second cylinder 320, a striker 330, and an interlocking structure 340. The first cylinder 310 comprises a cylinder housing 311, a first piston 312 driven by the drive assembly 400, a first chamber 313 formed by fitting between the first piston 312 and the cylinder housing 311, the first piston 312 having a front limit position and a rear limit position relative to the cylinder housing 311. The second cylinder 320 comprises a barrel 321, a second piston 322 disposed in the barrel 321, and a second chamber 323 formed by fitting between the second piston 322 and the barrel 321, the striker 330 being connected to the second piston 322, the striker 330 and the second piston 322 each having an initial position and a nail-striking position, the initial position and the nail-striking position of the striker 330 being synchronous with the initial position and the nail-striking position of the second piston 322, the interlocking structure 340 being configured to limit the second piston 322 to the initial position while the first piston 312 is moving from the front limit position to the rear limit position. An intake gap 314 is formed between the cylinder housing 311 and the first piston 312 at the front limit position, so that external air flows, via the intake gap 314, into the first chamber 313 of the first cylinder 310.

The external air may directly flow into the first chamber of the first cylinder via the intake gap, which may greatly improve air intake efficiency of the first chamber and thus ensure enough compressible air filled in the first chamber; this may reasonably increase pneumatic force of the cylinder assembly against the second piston upon nail driving, and thus may reasonably increase a nail-driving speed of the striker, thereby increasing nail-driving force and nail-penetration depth in a continuous nail-driving process, finally enhancing nail-driving performance.

Figure 3:
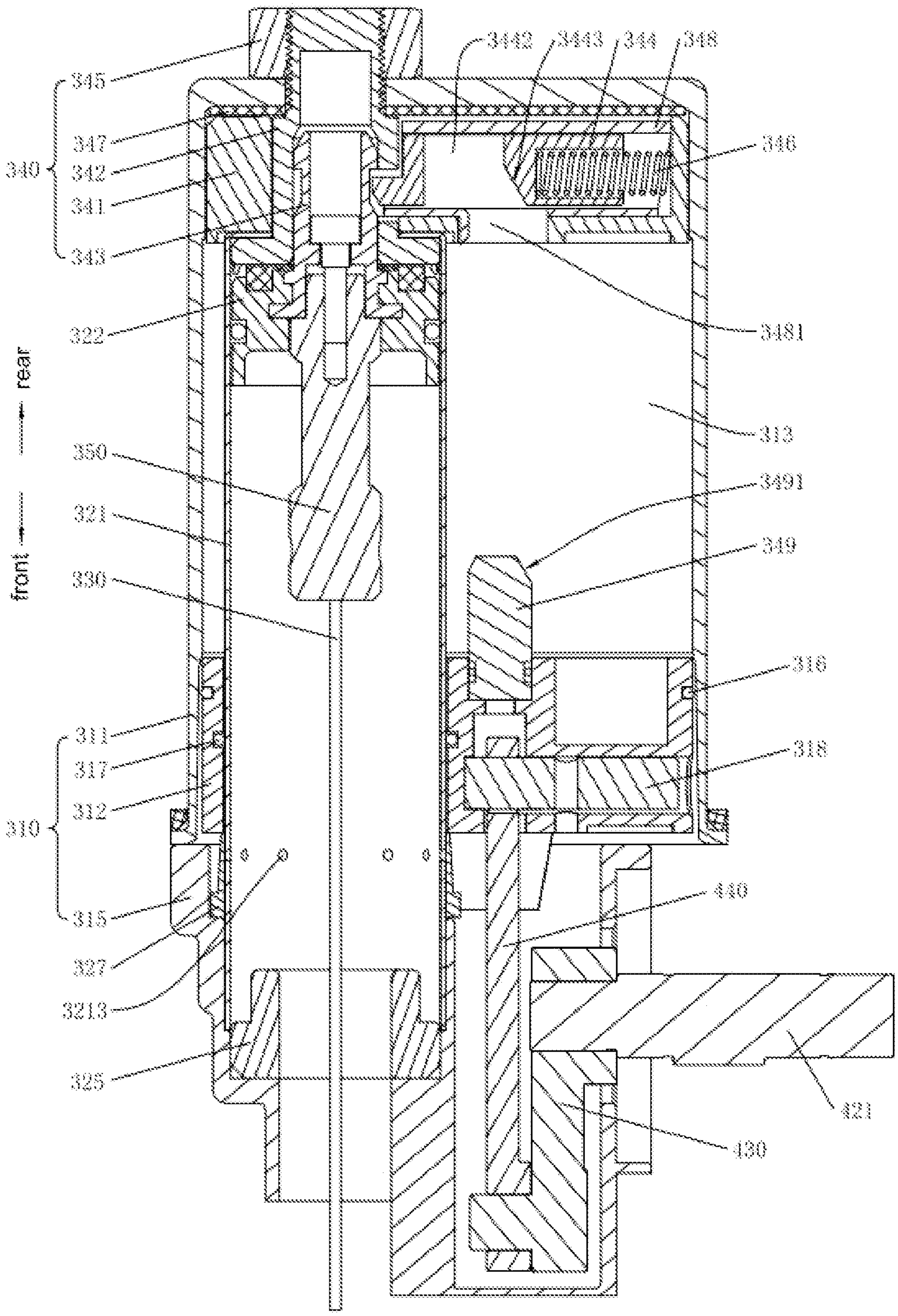
FIG. 3 is a structural diagram of a cylinder assembly when a first piston is located at a front limit position in the pneumatic nail gun according to the first implementation.
Figure 4:
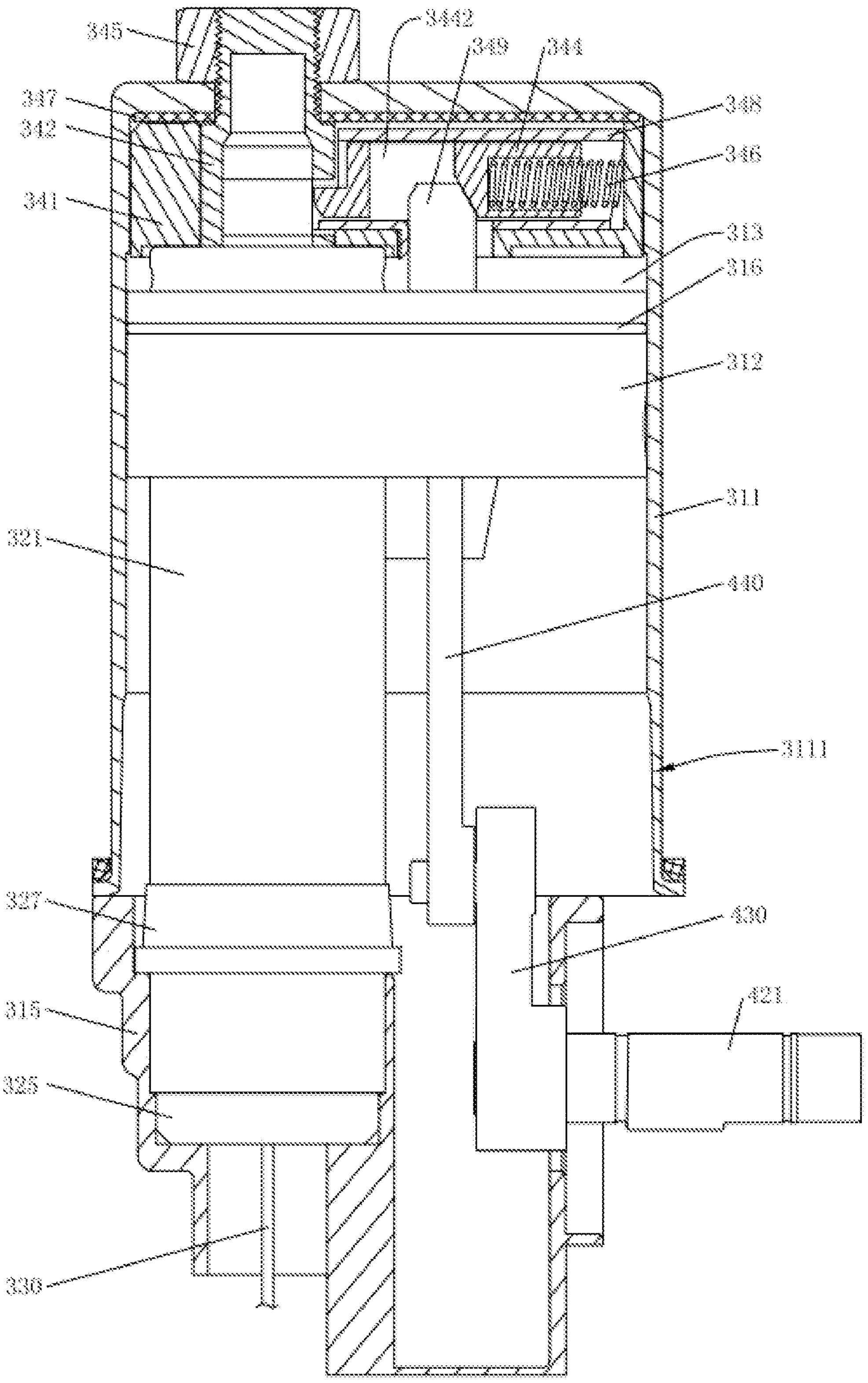
FIG. 4 is a structural diagram of the cylinder assembly when the first piston is located at a rear limit position in the pneumatic nail gun according to the first implementation.
Figure 5:
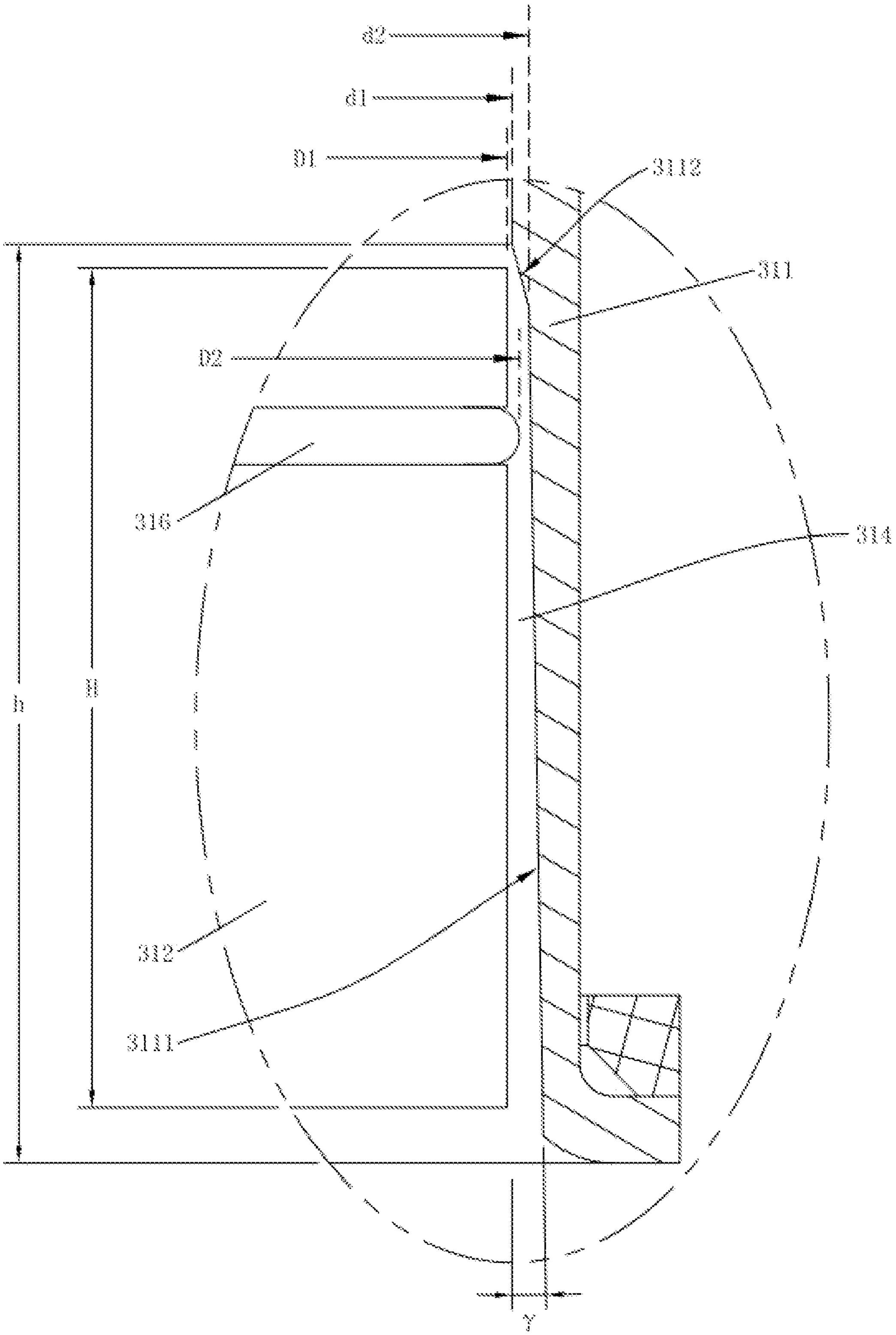
FIG. 5 is a local structural diagram of fitting between the first piston at the front limit position and the cylinder housing in the pneumatic nail gun according to the first implementation.

Referring to FIGS. 3 and 4, in this implementation, the cylinder housing 311 has a case shape featuring being opened in its front end and closed in its rear end; the first cylinder 310 also comprises a cylinder base 315 disposed at the front end of the cylinder housing 311, the cylinder housing 311 and the cylinder base 315 being fixed together. Referring to FIG. 5, an outer diameter II of the first piston 312 is smaller than an inner diameter d1 of the cylinder housing 311, an outer periphery of the first piston 312 is sleeved with an axially oriented first sealing ring 316, and the first sealing ring 316 is interference-fitted with an inner peripheral wall of the cylinder housing 311, i.e., an outer diameter D2 of the first sealing ring 316 is greater than an inner diameter d1 of the cylinder housing 311; the first sealing ring 316 enables peripheral sealing fit between the first piston 312 and the cylinder housing 311. In an example, the first sealing ring 316 in this implementation employs an O-shaped sealing ring; of course, the first sealing ring 316 may also employ other types of sealing rings, such as a sealing ring having a multi-pass sealing rim, which is not limited herein.

Referring to FIG. 5, in this implementation, the intake gap 314 is formed between the outer peripheral wall of the first piston 312 and the inner peripheral wall of the cylinder housing 311. To facilitate communication between the intake gap 314 and external air, the front end of the cylinder housing 311 is provided with an avoidance structure that allows for the first sealing ring 316 to be at least partially detached from the inner peripheral wall of the cylinder housing 311. In an example, the avoidance structure comprises a circular conical surface 3111 provided at a front end of the inner peripheral wall of the cylinder housing 311, the circular conical surface 3111 being formed to have a larger front end and a smaller rear end, a diameter d2 of the rear end of the circular conical surface 3111 is greater than the outer diameter D2 of the first sealing ring 316; the circular conical surface 3111 as provided reasonably expands the inner diameter of the front end of the cylinder housing 311. When the first piston 312 and the first sealing ring 316 are located at the front limit positions, the first sealing ring 316 does not contact the circular conical surface 3111, so that the intake gap 314 between the outer peripheral wall of the first piston 312 and the inner peripheral wall of the cylinder housing 311 allows for smooth communication with the external air. In this implementation, a single-sided clearance fit amount between D1 and d1 may be reasonably set to for example 0.3 mm, 0.4 mm, 0.5 mm, and 0.6 mm; a single-sided clearance fit amount between D2 and d1 may be reasonably set to for example 0.5 mm, 0.6 mm, 0.7 mm, 0.8 mm, 0.9 mm, and 1 mm, a difference between d2 and D2 may be reasonably set to for example 0.5 mm, 0.6 mm, 0.7 mm, 0.8 mm, 0.9 mm, and 1 mm, and an inclination angle $\gamma$ of the circular conical surface 3111 relative to an axial direction of the cylinder housing 311 may be reasonably set to for example 0.6°, 0.7°, 0.8°, 0.9°, 1°, 1.1°, 1.2°, 1.3°, 1.4°, and 1.5°; the disclosure are not limited to the values noted supra, so long as they can satisfy air intake requirements.

Referring to FIG. 5, in order to prevent formation of a right-angle step between the circular conical surface 3111 and the inner peripheral wall of the cylinder housing 311 causing an obstruction to rearward movement of the first piston 312, a circular conical transitional surface 3112 is provided between the rear end of the circular conical surface 3111 and the inner peripheral wall of the cylinder housing 311; the transitional surface 3112 is formed to have a larger front end and smaller rear end; a diameter of the front end of the transitional surface 3112 is consistent with the diameter d2 of the rear end of the circular conical surface 3111, and a diameter of the rear end of the transitional surface 3112 is consistent with the inner diameter d1 of the inner peripheral wall of the cylinder housing 311. To reasonably increase the single-sided width of the intake gap 314, a sum h of axial heights of the circular conical surface 3111 and transitional surface 3112 is greater than an axial height H of the first piston 312.

Figure 6:
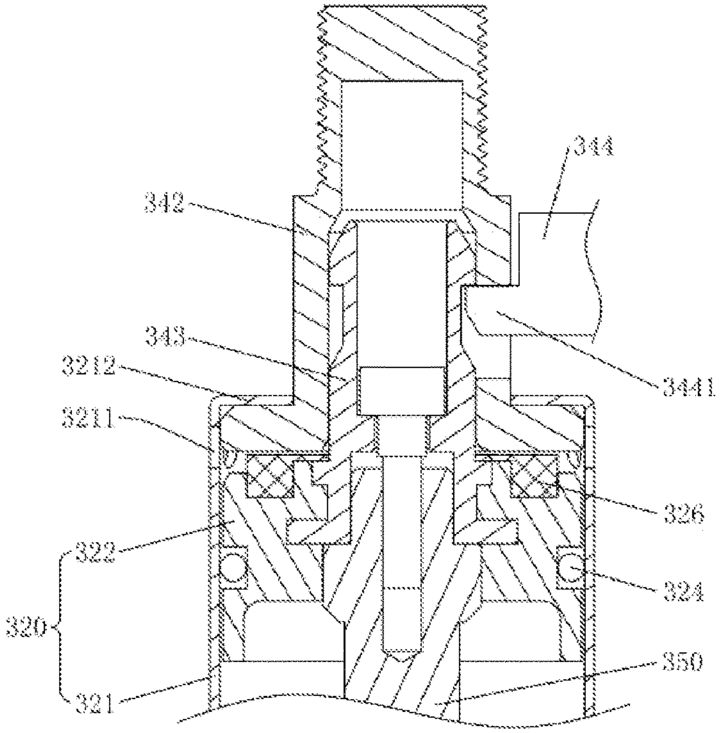
FIG. 6 is a local structural diagram of the cylinder assembly when a second piston is located at an initial position in the pneumatic nail gun according to the first implementation.
Figure 7:
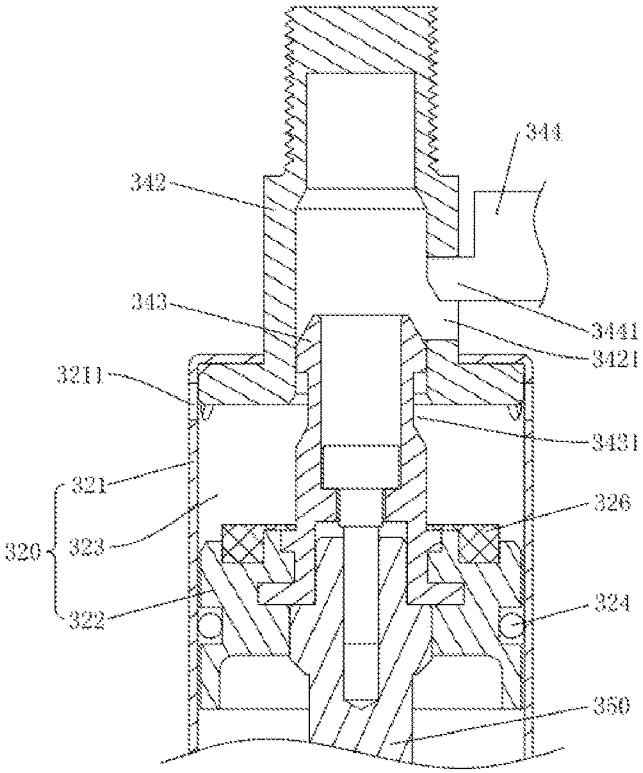
FIG. 7 is a local structural diagram of the second piston when released by an interlocking structure in the pneumatic nail gun according to the first implementation.

Referring to FIGS. 6 and 7, in this implementation, an outer periphery of the second piston 322 is sleeved with an axially oriented second sealing ring 324, the second piston 322 being in circumferential sealing fit with the barrel 321 via the second sealing ring 324. Referring to FIG. 3, the second cylinder 320 further comprises a head plug 325 disposed at a front end of the barrel 321, the second cylinder 320 is eccentrically disposed inside the first cylinder 310 and fixed on the cylinder base 315, the first piston 312 is provided with an eccentrically disposed port that is fitted with the barrel 321, the barrel 321 passes through the first piston 312 via the port, the first piston 312 may move forward and backward relative to the second cylinder 320, and a third sealing ring 317 maintaining a circumferential sealing fit between the first piston 312 and the barrel 321 is provided on an inner wall of the port or an outer wall of the barrel 321.

To enable air flow between the first chamber 313 and the second chamber 323, the barrel 321 is provided with a vent hole 3211 that communicates the first chamber 313 with the second chamber 323. When the second piston 322 and the second sealing ring 324 are located at the initial positions, the vent hole 3211 is at least partially disposed rear to the rear end surface of the second piston 322, and the vent hole 3211 is entirely disposed rear to the second sealing ring 324, so that the compressed air in the first chamber 313 may directly flow into the second chamber 323 via the vent hole 3211 to act on the second piston 322, driving the second piston 322 to bring the striker 330 to move forward from the initial position to a nail-striking position; this may reasonably increase the effective contact area of the compressed air acting on the second piston 322, such that the second piston 322 may achieve a larger initial driven force, increasing the initial speed of the second piston 322 released by the interlocking structure 340 to drive the striker 330 to move, which increases the speed of the second piston 322 driving the striker 330 to drive the nail, thereby increasing nail-penetration depth and also facilitating driving the nail into a hard material. In addition, since the compressed air in the first chamber 313 may directly flow into the second chamber 323 via the vent hole 3211 to act on the second piston 322, a need of providing, on the interlocking structure 340 or other member, a passage structure for the compressed air to flow into the second chamber 323 from the first chamber 313 is eliminated, which facilitates lowering structural difficulty and air-tightness requirements on relevant members.

Referring to FIG. 6, an integrally formed narrowed opening portion 3212 is provided at the rear end of the barrel 321, the vent hole 3211 is disposed at the rear end of the barrel 321 and in front of the narrowed opening portion 3212; a plurality of vent holes 3211 are arranged at intervals along a circumferential direction of the barrel 321. It is understood that, the vent holes 3211 may take on a reasonable shape such as a round, square, rectangular, oval, arc-shaped, or triangular shape; the vent holes 3211 may also take on various shapes of holes, e.g., they may take on any two or three or more shapes of holes of the round hole, the square hole, the rectangular hole, the oval hole, the arc-shaped hole, and the triangular hole; the shapes of the vent holes 3211 are not limited herein. The vent holes 3211 may be distributed at uniform intervals or at non-uniform intervals; the distribution manner of the vent holes 3211 is not limited herein. In addition, when the second piston 322 is located at the initial position, the area percentage of the vent holes 3211 against the rear area of the second piston 322 may be reasonably set to for example 50%, 55%, 60%, 65%, 70%, 75%, 80%, 85%, 90%, 95%, and 100%.

A shock-adsorbing cushion 326 is provided at the rear end of the second piston 322, and a groove structure for the compressed air to flow through is provided on the rear end surface of the shock-adsorbing cushion 326, an outer diameter of the shock-adsorbing cushion 326 being smaller than the outer diameter of the second piston 322 so that the compressed air flowed into the second chamber 323 via the vent hole 3211 may directly and effectively act on a top surface of the second piston 322. The groove structure comprises a radial groove and a peripheral groove which are arranged in an interleaved and inter-communication manner, so that the compressed air flowed into the second chamber 323 may pass through the groove structure to uniformly act on the rear end surface of the second piston 322. When the second piston 322 is located at the initial position, the vent hole 3211 is partially disposed rear to the shock-adsorbing cushion 326 which is also at the initial position, so that the compressed air flowed into the second chamber 323 via the vent hole 3211 may directly flow into the groove structure.

Figure 8:
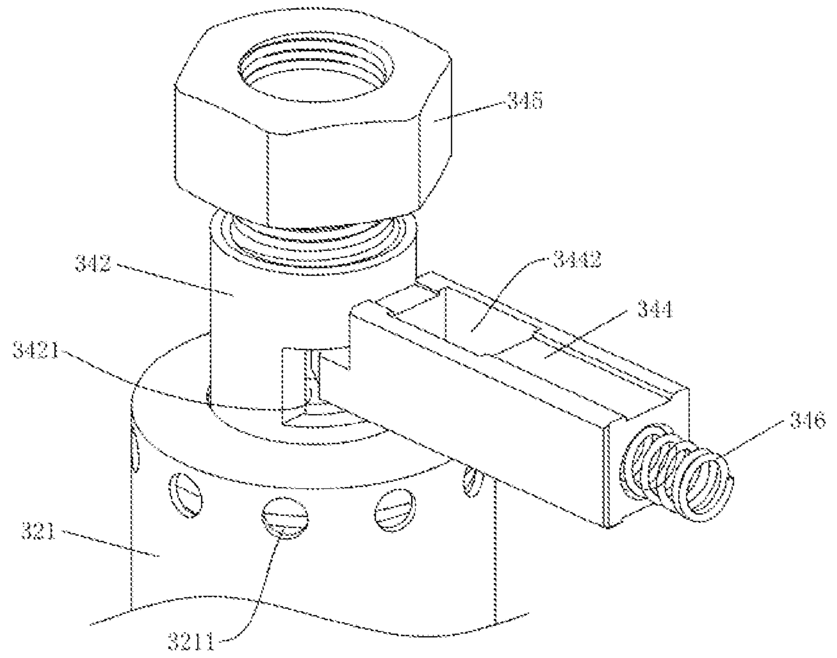
FIG. 8 is a local structural diagram of the interlocking structure and a second cylinder in the pneumatic nail gun according to the first implementation.

Referring to FIGS. 3 and 8, the interlocking structure 340 comprises a fixed base 341 fixed in the rear end of the cylinder housing 311, a locking bush 342 locked to the rear end wall of the cylinder housing 311 by a nut 345 and fixed relative to the fixed base 341, a lock core 343 forward-and-backward movably disposed in the locking bush 342, a sliding block 344 disposed in the fixed base 341 via a metal lock housing 348, a spring 346 disposed in the lock housing 348, and an elastic cushion 347 disposed between the fixed base 341 and the rear end wall of the cylinder housing 311; the striker 330 is fixedly connected to the second piston 322 or the lock core 343 via a rod body 350; a rear portion of the lock core 343 is provided with a circle of locking groove 3431 fitted with the sliding block 344; the sliding block 344 may slide reciprocally along a predetermined radial direction of the fixed base 341; one end of the spring 346 is fixedly positioned, and the other end thereof abuts against the sliding block 344; one end of the sliding block 344 facing the lock core 343 is provided with a stepped portion 3441 that is fitted with the locking groove 3431 to limit the second piston 322 to the initial position; the locking bush 342 is provided with a notch 3421 for avoiding the sliding block 344; and in a normal state, the spring 346 forces the sliding block 344 against the lock core 343 to cause the stepped portion 3441 and the locking groove 3431 to be interlocked. To prevent air leakage, the interlocking structure 340 may be sealed via a sealing grease or an O-shaped ring.

Referring to FIGS. 3 and 4, to enable the interlocking structure 340 to release the second piston 322 in time, the interlocking structure 340 further comprises an ejector pin 349 disposed on the first piston 312, the ejector pin 349 being configured for unlocking, a rear end of the ejector pin 349 being provided with a first bevel 3491; the sliding block 344 is provided with a through groove 3442 for the ejector pin 349 to insert, one side of the through groove 3442 being provided with a second bevel 3443 correspondingly parallel to the first bevel 3491; and the lock housing 348 is provided with an avoidance groove 3481 for avoiding the ejector pin 349. While the first piston 312 is moving rearward from the front limit position to the rear limit position, the ejector pin 349 is moving synchronously rearward along with the first piston 312 and may be inserted into the through groove 3442 via the avoidance groove 3481; the first bevel 3491 and the second bevel 3443 abut to force the sliding block 344 to move away from the lock core 343 so as to compress the spring 346, forcing the sliding block 344 to be detached from the locking groove 3431 of the lock core 343, whereby unlocking is realized.

Figure 2:
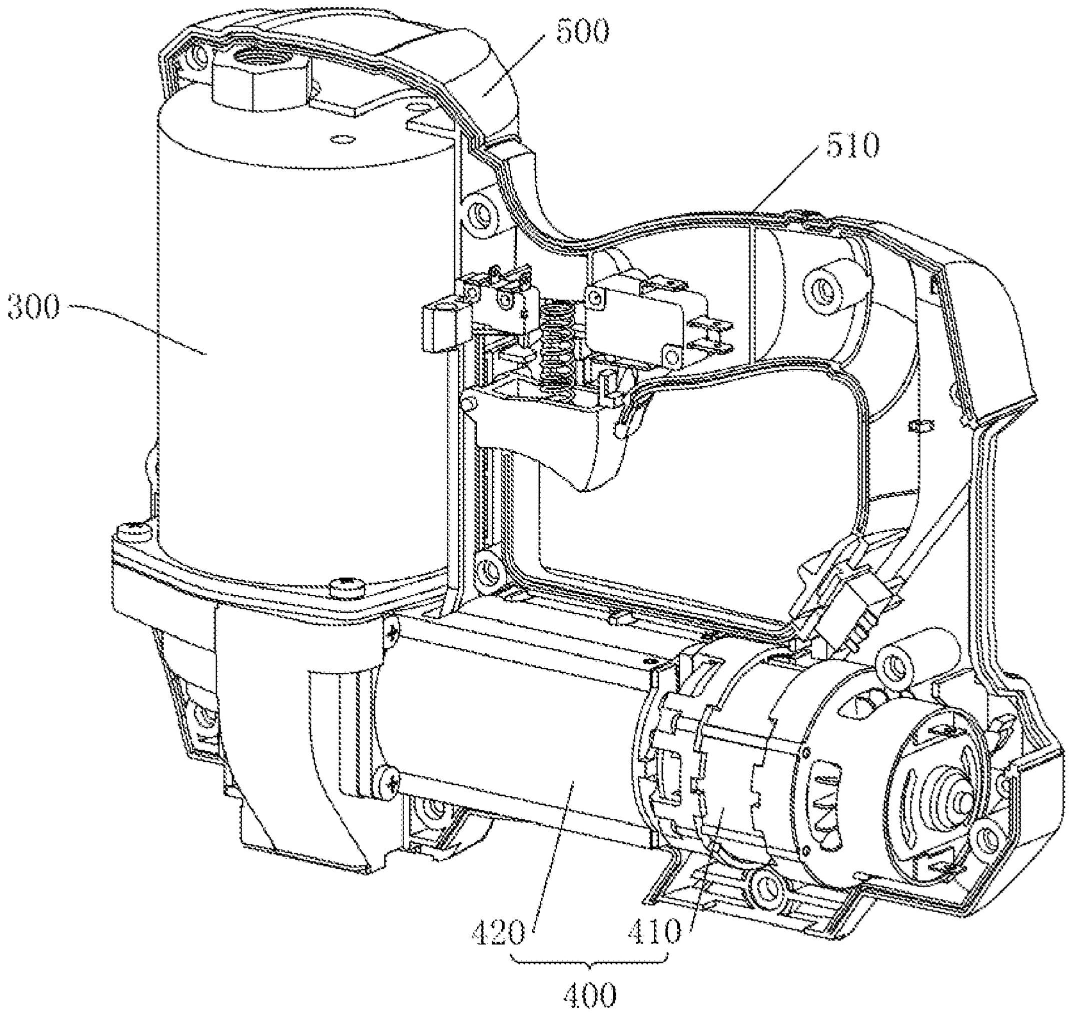
FIG. 2 is an internal structural diagram of a body of the pneumatic nail gun according to the first implementation.
Figure 9:
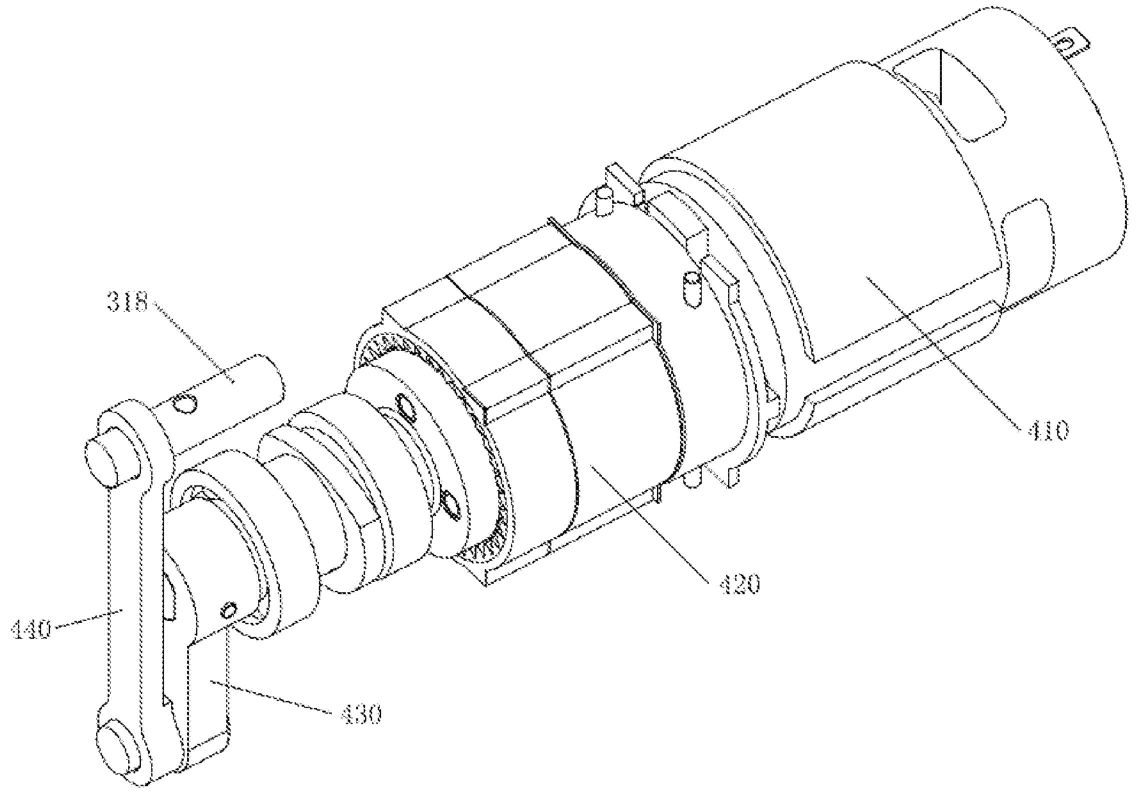
FIG. 9 is a structural diagram of a drive assembly in the pneumatic nail gun according to the first implementation.

Referring to FIG. 2, the body 100 comprises an enclosure 500, the enclosure 500 being formed with a grip portion 510. The axial direction of the drive assembly 400 is arranged perpendicular to the axial direction of the cylinder assembly 300. Referring to FIG. 9, the drive assembly 400 comprises a motor 410 and a speed reducer 420 which are fixed together. The speed reducer 420 comprises an output shaft 421, a tail end of the output shaft 421 projecting into the cylinder base 315 and being sleeved with a crank handle 430; a pin rod 318 is provided in the first piston 312; a connecting rod 440 is provided between the pin rod 318 and the crank handle 430; a top end of the connecting rod 440 is sleeved over the pin rod 318 to realize hinging with the first piston 312; the bottom end of the connecting rod 440 is hinged with the crank handle 430; the drive assembly 400 drives, via the crank handle 430 and the connecting rod 440, the first piston 312 to move reciprocally between the front limit position and the rear limit position. Referring to FIGS. 3 and 4, a plurality of pores 3213 distributed at intervals are provided at the front end of the barrel 321, the front end of the barrel 321 being sleeved with an elastic valve sleeve 327 for opening/closing the pores 3213.

In a shutdown status, the crank handle 430 and the connecting rod 440 of the drive assembly 400 overlap, as illustrated in FIG. 3, where the first piston 312 is located at the front limit position; now, the first sealing ring 316 does not contact the circular conical surface 3111, so that an intake gap 314 is formed between the outer peripheral wall of the first piston 312 and the circular conical surface 3111, allowing for external air to flow into the first chamber 313 via the intake gap 314, which ensures sufficient compressible air filled in the first chamber 313.

While the drive assembly 400 is driving, via the crank handle 430 and the connecting rod 440, the first piston 312 to move rearward from the front limit position till the first sealing ring 316 contacts the inner peripheral wall of the cylinder housing 311, the first chamber 313 is cut off from the external air, so that while the first piston 312 is continuing to move rearward, the first piston 312 compresses the air in the first chamber 313, whereby air pressure in the first chamber 313 increases.

Referring to FIG. 4, when the crank handle 430 and the connecting rod 440 move till being vertical to each other in a same straight line, the first piston 312 is located at the rear limit position; now, the first bevel 3491 of the ejector pin 349 is fitted with the second bevel 3443 of the sliding block 344 to cause the sliding block 344 to slide and the stepped portion 3441 to be detached from the locking groove 3431, whereby the second piston 322 is released and the high-pressure compressed air in the first cylinder 310 directly flows into the second chamber 323 via the vent hole 3211 to act on the second piston 322; part of the compressed air flows into the groove structure to act on the second piston 322 via the shock-adsorbing cushion 326; the second piston 322 released by the sliding block 344 is driven by the compressed air to drive the striker 330 to move forward.

After the second piston 322 and the striker 330 move forward a predetermined distance, the striker 330 accesses the nail fed by the nail feeding device 200 and applies a force against the nail, so that the nail departs from the nail feeding device 200 to be driven into an object such as wood, whereby the nail-driving action is implemented.

When the second piston 322 moves forward till abutting against the head plug 325, the second piston 322 and the striker 330 move forward till the nail-striking position; now, the nail-driving action has been completed, and the second piston 322 is located in front of the pores 3213. Due to the large air pressure in the second chamber 323, the elastic valve sleeve 327 opens the pores 3213 under the action of pressure difference, so that the high-pressure air in the second chamber 323 may be exhausted out via the pores 3213. When the air pressure in the second chamber 323 becomes balanced with the external air pressure, the elastic valve sleeve 327 closes the pores 3213, so that the second chamber 323 is cut off from the external air.

While the drive assembly 400 is driving, via the crank handle 430 and the connecting rod 440, the first piston 312 to move forward from the rear limit position till being reset to the front limit position, the air pressures in the first chamber 313 and the second chamber 323 are reduced, and the second piston 322 moves, under the action of negative pressure force, rearward from the nail-striking position till being reset to the initial position. When the second piston 322 moves rearward close to the initial position, the rear portion of the lock core 343 is inserted into the locking bush 342, and the circular conical surface of the rear end of the lock core 343 abuts against the stepped portion 3441 of the sliding block 344, so that the sliding block 344 first overcomes the elastic force of the spring 346 to slide a distance away from the lock core 343. When the second piston 322 drives the lock core 343 to move rearward till the initial position, the stepped portion 3441 corresponds to the locking groove 3431, and the sliding block 344, under the elastic action of the spring 346, slides towards the lock core 343, causing the stepped portion 3441 to be inserted into the locking groove 3431, thereby limiting the second piston 322 and the striker 330 to the initial position. When the first piston 312 moves forward till the front limit position, the first sealing ring 316 is detached from the circular conical surface 3111, and the intake gap 314 is formed between the outer peripheral wall of the first piston 312 and the inner peripheral wall of the cylinder housing 311 so that the external air flows into the first chamber 313 via the intake gap 314, and then a next nail-driving action is performed.

Since the compressed air in the first chamber 313 directly flows into the second chamber 323 via the vent hole 3211 to act on the second piston 322 upon nail driving, a need of providing, on the fixed base 341 and the locking bush 342, a passage structure for the compressed air to flow through is eliminated, and the requirements on the air-tight structure of the fixed base 341 are lowered, thereby facilitating reduction of the structural difficulty and air-tightness demands on relevant structures.

The nail-driving device 200 and other structures in the pneumatic nail gun in this implementation may refer to the Chinese invention patent No. CN109623736A and the U.S. invention U.S. patent Ser. No. 11/478,912B2, which will not be detailed here.

It is understood that, the second cylinder 320 may also be disposed outside the first cylinder 310 and arranged in juxtaposition with the first cylinder 310; in this case, the interlocking structure 340 may be disposed rear to the two cylinders, and a passage structure for the compressed air in the first chamber 313 to flow into the second chamber 323 is provided between the two cylinders.

It is understood that the narrowed opening portion 3212 of the barrel 321 may also be eliminated.

It is understood that the interlocking structure 340 may also adopt an existing magnetic attraction structure.

Second Implementation

Figure 10:
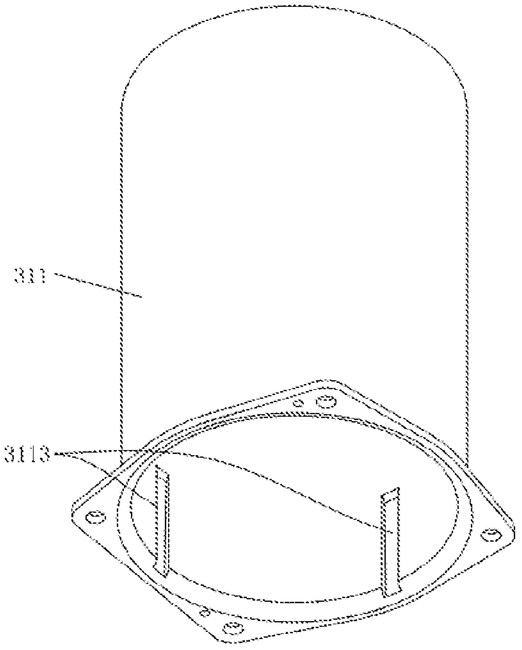
FIG. 10 is a structural diagram of a cylinder housing in a pneumatic nail gun according to a second implementation.
Figure 11:
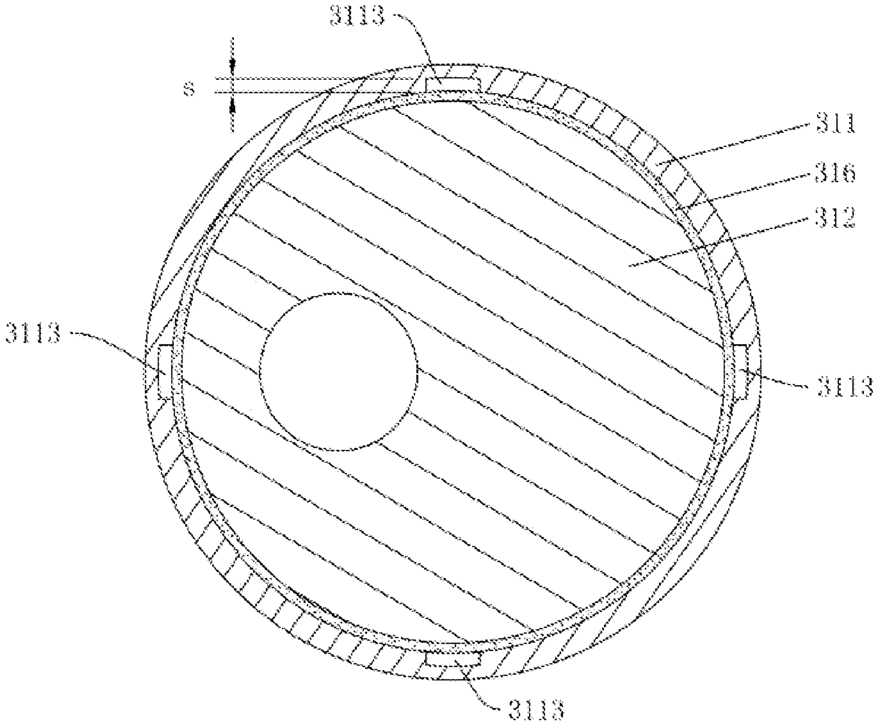
FIG. 11 is a structural schematic diagram of fitting between a first piston at a front limit position and the cylinder housing in the pneumatic nail gun according to the second implementation.

Referring to FIGS. 10 and 11, in this implementation, the avoidance structure comprises a recessed groove 3113 disposed at the front end of the inner peripheral wall of the cylinder housing 311, a depth s of the recessed groove 3113 being greater than the interference fit amount between the first sealing ring 316 and the inner peripheral wall of the cylinder housing 311 (D2−d1). When the first piston 312 and the first sealing ring 316 are located at the front limit positions, a portion of the first sealing ring 316 corresponding to the recessed groove 3113 is detached from a groove wall of the recessed groove 3113, i.e., the portion of the first sealing ring 316 corresponding to the recessed groove 3113 does not contact the inner wall of the cylinder housing 311, so that the intake gap 314 formed between the outer peripheral wall of the first piston 312 and the inner peripheral wall of the cylinder housing 311 allows for communication with the external air via the recessed groove 3113. In an example, the recessed groove 3113 is elongated by extending rearward from the front end surface of the cylinder housing 311, and a plurality of recessed grooves 3113 may be provided at intervals along a circumferential direction of the cylinder housing 311.

The remaining structures of the second implementation are identical to the first implementation, which will not be detailed herein.

It is understood that, the recessed groove 3113 may alternatively be set to have other reasonable shapes such as an s-shape, an arc shape, etc.

It is understood that, two, three, four, five, six, and other reasonable number of recessed grooves 3113 may be provided at intervals along the circumferential direction of the cylinder housing 311.

It is understood that to satisfy air intake requirements, the recessed groove 3113 has an appropriate depth and width.

It is understood that, the avoidance structure may be provided with both of the circular conical surface 3111 in the first implementation and the recessed groove 3113 in the second implementation; in this case, the recessed groove 3113 is provided on the circular conical surface 3111.

Third Implementation

Figure 12:
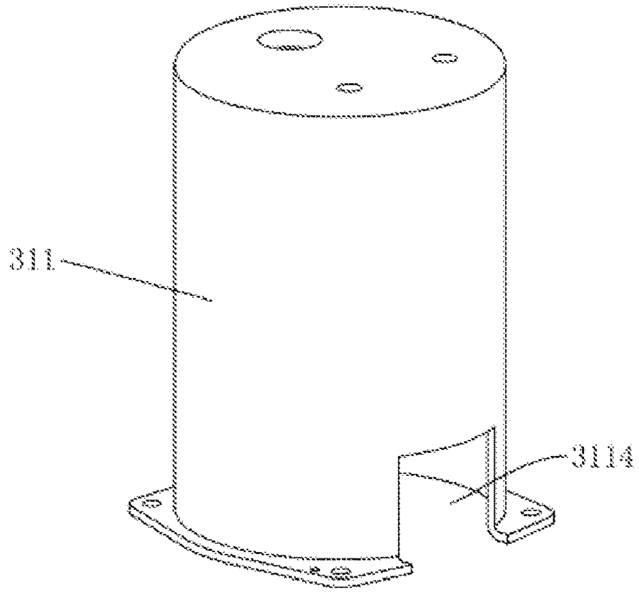
FIG. 12 is a structural diagram of a cylinder housing in a pneumatic nail gun according to a third implementation.
Figure 13:
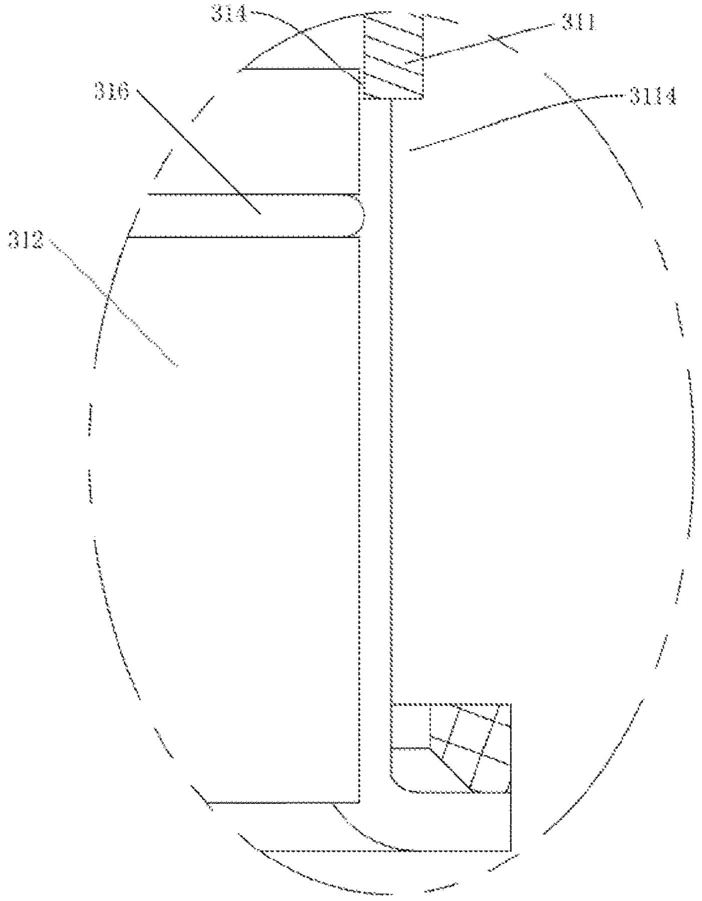
FIG. 13 is a local structural diagram of fitting between a first piston at a front limit position and the cylinder housing in the pneumatic nail gun according to the third implementation.

Referring to FIGS. 12 and 13, in this implementation, the avoidance structure comprises an indentation 3114 provided at the front end of the cylinder housing 311; when the first piston 312 and the first sealing ring 316 are located at the front limit positions, a portion of the first sealing ring 316 corresponding to the indentation 3114 is detached from the cylinder housing 311 due to being exposed to the indentation 3114, i.e., the portion of the first sealing ring 316 corresponding to the indentation 3114 does not contact the inner peripheral wall of the cylinder housing 311, forming the intake gap 314 to communicate with the external air via the indentation 3114, so that the external air may flow into the first chamber 313 from the intake gap 314. In an example, a height of the indentation 3114 is lower than an axial height H of the first piston 312, so that when the first piston 312 is located at the front limit position, the rear end surface of the first piston 312 is disposed rear to a rear groove wall of the indentation 3114.

The remaining structures of the third implementation are identical to the first implementation, which will not be detailed herein.

It is understood that, one, two, three, or any appropriate number of indentations 3114 may be provided, so long as intake requirements are satisfied.

It is understood that, to increase the width of the intake gap 314 to an appropriate extent, a conical surface, which is disposed rear to the first sealing ring 316 and has a larger front end and a smaller rear end, may be provided on the outer periphery of the first piston 312.

It is understood that, when the first piston 312 is located at the front limit position, the rear end surface of the first piston 312 and the rear groove wall of the indentation 3114 may be aligned fore-and-aft. Of course, when the first piston 312 is located at the front limit position, the rear end surface of the first piston 312 may also be located in front of the rear groove wall of the indentation 3114.

It is understood that, the avoidance structure may comprise both of the circular conical surface 3111 in the first implementation and the indentation 3114 in the third implementation; in this case, the height of the indentation 3114 may be consistent with the axial height of the circular conical surface 3111 or slightly lower than the axial height of the circular conical surface 3111.

It is understood that, the avoidance structure may comprise both of the recessed groove 3113 in the second implementation and the indentation 3114 in the third implementation; in this case, the recessed groove 3113 and the indentation 3114 are staggered along the circumferential direction of the cylinder housing 311.

It is understood that, the avoidance structure may comprise all of the circular conical surface 3111 in the first implementation, the recessed groove 3113 in the second implementation, and the indentation 3114 in the third implementation; in this case, the height of the indentation 3114 may be consistent with the axial height of the circular conical surface 3111 or may be slightly lower than the axial height of the circular conical surface 3111, and the recessed groove 3113 and the indentation 3114 are staggered along the circumferential direction of the cylinder housing 311.

Fourth Implementation

Figure 14:
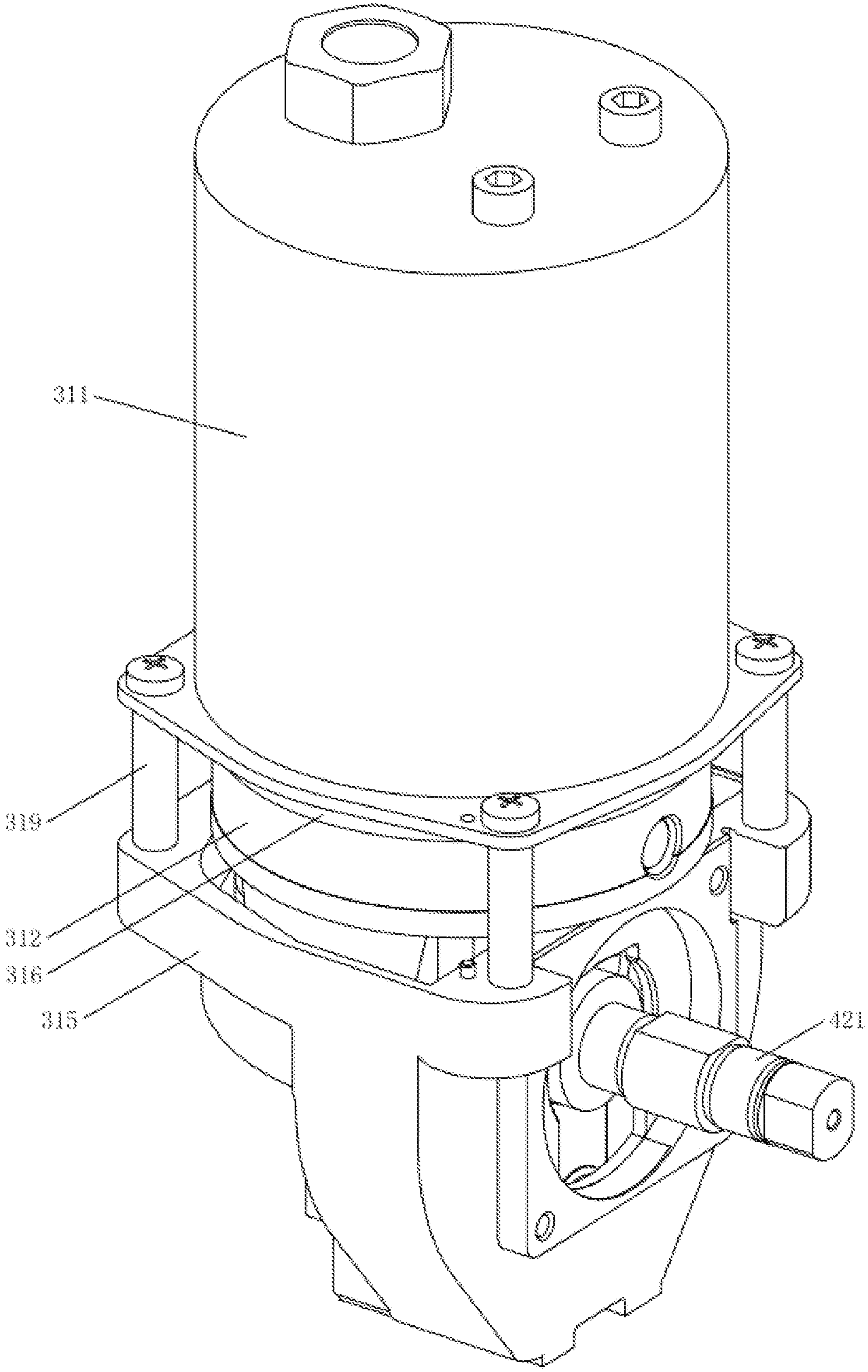
FIG. 14 is a structural diagram of a cylinder assembly in a pneumatic nail gun according to a fourth implementation.
Figure 15:
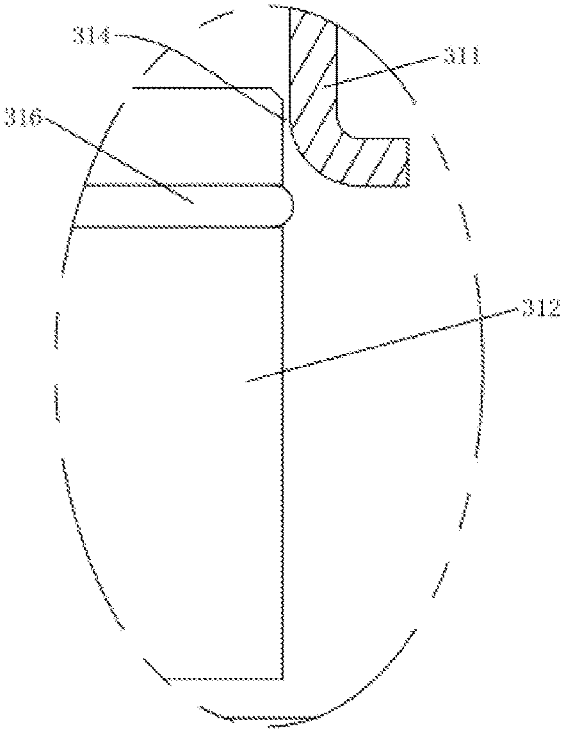
FIG. 15 is a local structural diagram of fitting between a first piston at a front limit position and the cylinder housing in the pneumatic nail gun according to the fourth implementation.

Referring to FIGS. 14 and 15, in this implementation, when the first piston 312 is located at a limit position, the first piston 312 partially projects out of the cylinder housing 311 so that the first sealing ring 316 is disposed outside the cylinder housing 311 as the first piston 212 is detached from the cylinder housing 311; in this case, the first sealing ring 316 does not contact the inner peripheral wall of the cylinder housing 311, forming the intake gap 314 between the outer peripheral wall of the rear end of the first piston 312 and the inner peripheral wall of the cylinder housing 311, whereby external air may flow into the first chamber 313 via the intake gap 314. As an example, the axial height of the cylinder housing 311 is appropriately reduced in this implementation, so that the cylinder housing 311 and the cylinder base 315 are spaced but fixed together via a support pillar 319, i.e., the cylinder housing 311 and the cylinder base 315 are fore-and-aft spaced, and the fore-and-aft spacing therebetween provides space for the first piston 312 to project out of the cylinder housing 311.

The remaining structures of the fourth implementation are identical to the first implementation, which will not be detailed herein.

Fifth Implementation

Based on the fourth implementation, to facilitate the first piston 312 to re-enter the cylinder housing 311, the front end of the inner peripheral wall of the cylinder housing 311 is provided with the circular conical surface 3111 in the first implementation, the circular conical surface 3111 guiding the first piston 312 to enter the cylinder housing 311, improving movement stability of the first piston 312. Additionally, when the first piston 312 is located at the front limit position, the circular conical surface 3111 may also appropriately increase the width of the intake gap 314, thereby facilitating improvement of air intake efficiency.

The remaining structures of the fifth implementation are identical to the first implementation, which will not be detailed herein.

Sixth Implementation

Figure 16:
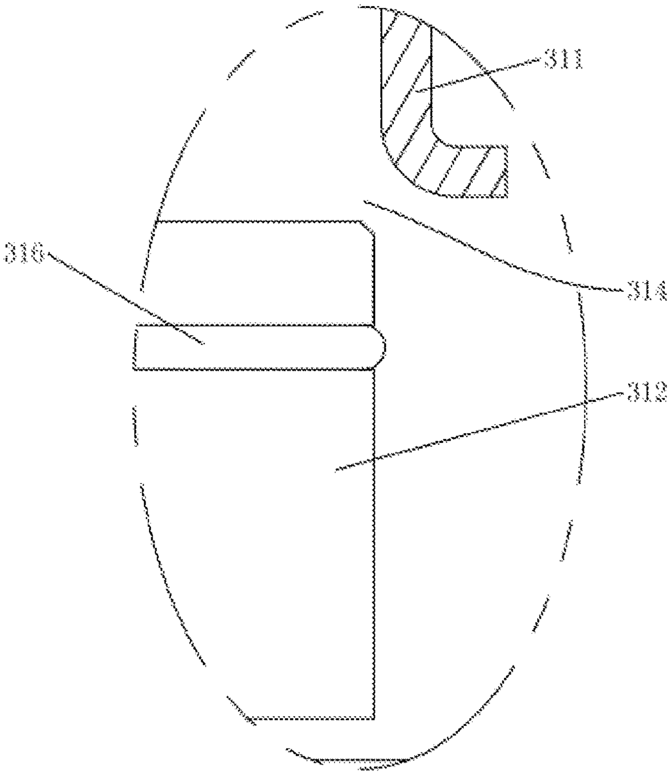
FIG. 16 is a local structural diagram of fitting between a first piston at a front limit position with a cylinder housing in a pneumatic nail gun according to a sixth implementation.

Referring to FIG. 16, in this implementation, when the first piston 312 and the first sealing ring 316 are located at the front limit position, the first piston 312 entirely projects out of the cylinder housing 311, i.e., the rear end surface of the first piston 312 extends forward beyond the front end surface of the cylinder housing 311; in this case, the first sealing ring 316 is disposed outside the cylinder housing 311 as the first piston 312 is detached from the cylinder housing 311, whereby the first sealing ring 316 does not contact the inner peripheral wall of the cylinder housing 311, forming the intake gap 314 between the rear end of the first piston 312 and the front end of the cylinder housing 311, thereby allowing for the external air to flow into the first chamber 313 via the intake gap 314.

The remaining structures of the sixth implementation are identical to the first implementation, which will not be detailed herein.

It is understood that, to facilitate the first piston 312 to re-enter the cylinder housing 311, the front end of the inner peripheral wall of the cylinder housing 311 may be provided with the circular conical surface 3111 in the first implementation; the circular conical surface 3111 guides the first piston 312 to enter the cylinder housing 311, facilitating improving movement stability of the first piston 312.

In addition to the example implementations described supra, the disclosure still has other example implementations. Any modifications and variations made by those skilled in the art according to the disclosure shall fall within the scope defined in the appended claims without departing from the spirit of the disclosure.

I claim:

1. A pneumatic nail gun, comprising:
a body and a nail feeding device,
the body comprising a cylinder assembly and a drive assembly,
the cylinder assembly comprising a first cylinder, a second cylinder, a striker, and an interlocking structure,
the first cylinder comprising a cylinder housing, a first piston driven by the drive assembly, and a first chamber formed by fitting between the first cylinder and the cylinder housing, the first piston having a front limit position and a rear limit position relative to the cylinder housing, the second cylinder comprising a barrel, a second piston disposed in the barrel, and a second chamber formed by fitting between the second piston and the barrel, the striker being connected to the second piston, the striker and the second piston each having an initial position and a nail-striking position, the initial position and the nail-striking position of the striker being synchronous to the initial position and the nail-striking position of the second piston, the inter-locking structure limiting the second piston to the initial position while the first piston is moving from the front limit position towards the rear limit position, wherein:

an intake gap is formed between the cylinder housing and the first piston located at the front limit position, the intake gap allowing for external air to flow into the first chamber of the first cylinder, the second cylinder is disposed in the first cylinder, the barrel passes through the first piston, the interlocking structure is disposed in a rear end of the cylinder housing, the barrel is provided with a vent hole communicating the first chamber and the second chamber, and the vent hole is at least partially disposed rear to the second piston at the initial position so that compressed air in the first chamber flows into the second chamber via the vent hole to act on the second piston, driving the second piston to bring the striker to move forward from the initial position to the nail-striking position.

2. The pneumatic nail gun according to claim 1, wherein an outer diameter of the first piston is smaller than an inner diameter of the cylinder housing, and the intake gap is formed between an outer peripheral wall of the first piston and an inner peripheral wall of the cylinder housing.

3. The pneumatic nail gun according to claim 2, wherein a first sealing ring interference-fitted with the inner peripheral wall of the cylinder housing is located at and sleeves an outer periphery of the first piston, and a portion of the first piston at the front limit position projects out of the cylinder housing, so that the first sealing ring, which is located at the front limit position along with the first piston, is detached from the cylinder housing.

4. The pneumatic nail gun according to claim 3, wherein a front end of the inner peripheral wall of the cylinder housing is provided with a circular conical surface for guiding the first piston to access the circular conical surface in the cylinder housing.

5. The pneumatic nail gun according to claim 1, wherein an outer diameter of the first piston is smaller than an inner diameter of the cylinder housing, a first sealing ring interference-fitted with the inner peripheral wall of the cylinder housing is located at and sleeves an outer periphery of the first piston, the first piston at the front limit position completely projects out the cylinder housing, and the intake gap is formed between a rear end of the first piston and a front end of the cylinder housing.

6. The pneumatic nail gun according to claim 5, wherein a front end of the inner peripheral wall of the cylinder housing is provided with a circular conical surface for guiding the first piston to access the circular conical surface in the cylinder housing.

7. A pneumatic nail gun, comprising:

a body and a nail feeding device, the body comprising a cylinder assembly and a drive assembly, the cylinder assembly comprising a first cylinder, a second cylinder, a striker, and an interlocking structure, the first cylinder comprising a cylinder housing, a first piston driven by the drive assembly, and a first chamber formed by fitting between the first cylinder and the cylinder housing, the first piston having a front limit position and a rear limit position relative to the cylinder housing, the second cylinder comprising a barrel, a second piston disposed in the barrel, and a second chamber formed by fitting between the second piston and the barrel, the striker being connected to the second piston, the striker and the second piston each having an initial position and a nail-striking position, the initial position and the nail-striking position of the striker being synchronous to the initial position and the nail-striking position of the second piston, the inter-locking structure limiting the second piston to the initial position while the first piston is moving from the front limit position towards the rear limit position, wherein:

an intake gap is formed between the cylinder housing and the first piston located at the front limit position, the intake gap allowing for external air to flow into the first chamber of the first cylinder, an outer diameter of the first piston is smaller than an inner diameter of the cylinder housing, and the intake gap is formed between an outer peripheral wall of the first piston and an inner peripheral wall of the cylinder housing, a first sealing ring interference-fitted with the inner peripheral wall of the cylinder housing is located at and sleeves an outer periphery of the first piston, and a front end of the cylinder housing is provided with an avoidance structure allowing for the first sealing ring to be at least partially detached from the inner peripheral wall of the cylinder housing.

8. The pneumatic nail gun according to claim 7, wherein the avoidance structure comprises a circular conical surface provided at a front end of the inner peripheral wall of the cylinder housing, the circular conical surface having a larger front end and a smaller rear end, an inner diameter of the circular conical surface being greater than an outer diameter of the first sealing ring, so that the first sealing ring, which is located at the front limit position along with the first piston, is detached from the circular conical surface.

9. The pneumatic nail gun according to claim 7, wherein the avoidance structure comprises a recessed groove provided at a front end of the inner peripheral wall of the cylinder housing, a depth of the recessed groove being greater than an interference fit amount between the first sealing ring and the inner peripheral wall of the cylinder housing, so that a portion of the first sealing ring, which is located at the front limit position along with the first piston, corresponding to the recessed groove, is detached from a groove wall of the recessed groove.

10. The pneumatic nail gun according to claim 7, wherein the avoidance structure comprises an indentation provided at the front end of the cylinder housing, so that a portion of the first sealing ring, which is located at the front limit position along with the first piston, corresponding to the indentation, is detached from the cylinder housing due to being exposed to the indentation.

11. The pneumatic nail gun according to claim 7, wherein:

the second cylinder is disposed in the first cylinder, the barrel passes through the first piston, the interlocking structure is disposed in a rear end of the cylinder housing, the barrel is provided with a vent hole communicating the first chamber and the second chamber, and the vent hole is at least partially disposed rear to the second piston at the initial position so that compressed air in the first chamber flows into the second chamber via the vent hole to act on the second piston, driving the second piston to bring the striker to move forward from the initial position to the nail-striking position.

12. A pneumatic nail gun, comprising:

a body and a nail feeding device, the body comprising a cylinder assembly and a drive assembly, the cylinder assembly comprising a first cylinder, a second cylinder, a striker, and an interlocking structure, the first cylinder comprising a cylinder housing, a first piston driven by the drive assembly, and a first chamber formed by fitting between the first cylinder and the cylinder housing, the first piston having a front limit position and a rear limit position relative to the cylinder housing, the second cylinder comprising a barrel, a second piston disposed in the barrel, and a second chamber formed by fitting between the second piston and the barrel, the striker being connected to the second piston, the striker and the second piston each having an initial position and a nail-striking position, the initial position and the nail-striking position of the striker being synchronous to the initial position and the nail-striking position of the second piston, the inter-locking structure limiting the second piston to the initial position while the first piston is moving from the front limit position towards the rear limit position, wherein:

an intake gap is formed between the cylinder housing and the first piston located at the front limit position, the intake gap allowing for external air to flow into the first chamber of the first cylinder, an outer diameter of the first piston is smaller than an inner diameter of the cylinder housing, a first sealing ring interference-fitted with the inner peripheral wall of the cylinder housing is located at and sleeves an outer periphery of the first piston, the first piston at the front limit position completely projects out the cylinder housing, and the intake gap is formed between a rear end of the first piston and a front end of the cylinder housing.

13. The pneumatic nail gun according to claim 12, wherein a front end of the inner peripheral wall of the cylinder housing is provided with a circular conical surface for guiding the first piston to access the circular conical surface in the cylinder housing.

14. The pneumatic nail gun according to claim 12, wherein:

the second cylinder is disposed in the first cylinder, the barrel passes through the first piston, the interlocking structure is disposed in a rear end of the cylinder housing, the barrel is provided with a vent hole communicating the first chamber and the second chamber, and the vent hole is at least partially disposed rear to the second piston at the initial position so that compressed air in the first chamber flows into the second chamber via the vent hole to act on the second piston, driving the second piston to bring the striker to move forward from the initial position to the nail-striking position.

* * * * *